United States Patent
Tsai

(10) Patent No.: US 12,526,798 B2
(45) Date of Patent: Jan. 13, 2026

(54) METHOD AND USER EQUIPMENT FOR TRANSMISSION CONFIGURATION INDICATION (TCI) STATE APPLICATION

(71) Applicant: MEDIATEK INC., Hsin-Chu (TW)

(72) Inventor: Cheng-Rung Tsai, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 494 days.

(21) Appl. No.: 17/840,891

(22) Filed: Jun. 15, 2022

(65) Prior Publication Data

US 2023/0034356 A1 Feb. 2, 2023

Related U.S. Application Data

(60) Provisional application No. 63/275,981, filed on Nov. 5, 2021, provisional application No. 63/226,806, filed on Jul. 29, 2021.

(51) Int. Cl.
*H04W 72/12* (2023.01)
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .. H04L 5/0091; H04W 72/1273; H04W 72/23
USPC ......................................................... 370/329
See application file for complete search history.

(56) References Cited

U.S. PATENT DOCUMENTS

| | | | |
|---|---|---|---|
| 2020/0154489 A1 | 5/2020 | Zhou et al. | H04W 74/08 |
| 2021/0021450 A1 | 1/2021 | Zhang et al. | H04L 27/26 |
| 2021/0136802 A1* | 5/2021 | Cirik | H04L 5/0092 |
| 2021/0168858 A1 | 6/2021 | Liu et al. | H04W 74/00 |
| 2021/0391899 A1* | 12/2021 | Cao | H04B 7/088 |
| 2022/0046691 A1* | 2/2022 | Kim | H04L 5/0055 |
| 2022/0077969 A1* | 3/2022 | Kim | H04L 1/1861 |
| 2022/0110148 A1* | 4/2022 | Oh | H04W 72/23 |
| 2022/0166468 A1* | 5/2022 | Go | H04B 7/0404 |
| 2022/0217621 A1* | 7/2022 | Papasakellariou | H04W 72/23 |
| 2023/0047603 A1* | 2/2023 | Kim | H04L 1/08 |

(Continued)

FOREIGN PATENT DOCUMENTS

| | | |
|---|---|---|
| EP | 3641461 A1 | 5/2019 |
| WO | 2019244223 A1 | 12/2019 |

OTHER PUBLICATIONS

Taiwan IPO, office action for the Taiwanese patent application 111128301 (no English translation is available), dated Sep. 7, 2022 (7 pages).

(Continued)

*Primary Examiner* — Robert J Lopata

(74) *Attorney, Agent, or Firm* — Helen Mao; Zheng Jin; Imperium Patent Works

(57) ABSTRACT

Method and UE are provided for transmission configuration indication (TCI) state application. In particular, a UE can receive an indication of a specific TCI state from a network. Then the UE can apply the specific TCI state for at least one transmission in a CORESET associated with at least one search space set when: (1) the at least one search space set is configured with a first type; or (2) any of the at least one search space set is configured with a second type and the CORESET associated is configured to follow the specific TCI state.

20 Claims, 5 Drawing Sheets

(56) References Cited

U.S. PATENT DOCUMENTS

| | | | |
|---|---|---|---|
| 2023/0123718 A1* | 4/2023 | Farag | H04L 5/0053 |
| | | | 370/329 |
| 2023/0216565 A1* | 7/2023 | Kwak | H04B 7/0695 |
| | | | 375/267 |
| 2023/0300881 A1* | 9/2023 | Myung | H04L 5/00 |
| | | | 370/329 |
| 2024/0015740 A1* | 1/2024 | Xiao | H04W 72/1273 |
| 2024/0089061 A1* | 3/2024 | Gao | H04L 5/0098 |
| 2024/0306080 A1* | 9/2024 | Park | H04L 5/005 |

OTHER PUBLICATIONS

European IPO, office action for the European patent application 22187783.0 (no English translation is available), dated Nov. 29, 2022 (12 pages).
R1-1807796, MediaTek Inc., 3GPP TSG RAN WG1 Meeting #93, Summary 2 on Remaining Issues on Beam Failure Recovery, dated May 21-25, 2018 (29 pages).
R1-2202057, MediaTek Inc., 3GPP TSG RAN WG1 #108-e, Remaining Issues on Rel-17 multi-beam operation, dated Feb. 11-19, 2022 (13 pages).
European Intellectual Property Office Action 22187783.0-1206 Dated Jun. 3, 2025.
Erickson: "On common beam for PDSCH and PDCCH" 3GPP Draft; R1-1718746 ; 20171099-2017103, XP051353234.
3GPP tsg_ran\wg1_rl1, "R1-1807796_Summary_BFR_v07".

* cited by examiner

METHOD AND USER EQUIPMENT FOR TRANSMISSION CONFIGURATION INDICATION (TCI) STATE APPLICATION

CROSS REFERENCE TO RELATED APPLICATIONS

This application claims the benefit under 35 U.S.C. § 119 from U.S. provisional application Ser. No. 63/226,806, entitled "Transmission Configuration Indication for PDCCH and PDSCH," filed on Jul. 29, 2021; U.S. Provisional Application No. 63/275,981, entitled "Transmission Configuration Indication for PDCCH and PDSCH," filed on Nov. 5, 2021, the subject matter of which is incorporated herein by reference.

TECHNICAL FIELD

The disclosed embodiments relate generally to wireless communication, and, more particularly, to method and user equipment for transmission configuration indication (TCI) state application.

BACKGROUND

In conventional network of 3rd generation partnership project (3GPP) 5G new radio (NR), the user equipment (UE) can be configured, by the base station (BS), with: (1) one or more control resource sets (CORESETs); (2) one or more search space sets; and (3) a plurality of transmission configuration indication (TCI) states. The BS can transmit an activation command to the UE for the UE to apply at least one of the TCI states. However, some details of applying the at least one of the TCI states have not been determined and need to be further discussed.

SUMMARY

Method and user equipment (UE) are provided for transmission configuration indication (TCI) state application. In particular, a UE can receive an indication of a specific TCI state from a network. Then the UE can apply the specific TCI state for receptions corresponding to a control resource set (CORESET) associated with at least one search space set when: (1) the at least one search space set is configured with a first type; or (2) any of the at least one search space set is configured with a second type and the CORESET is configured to follow the specific TCI state.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
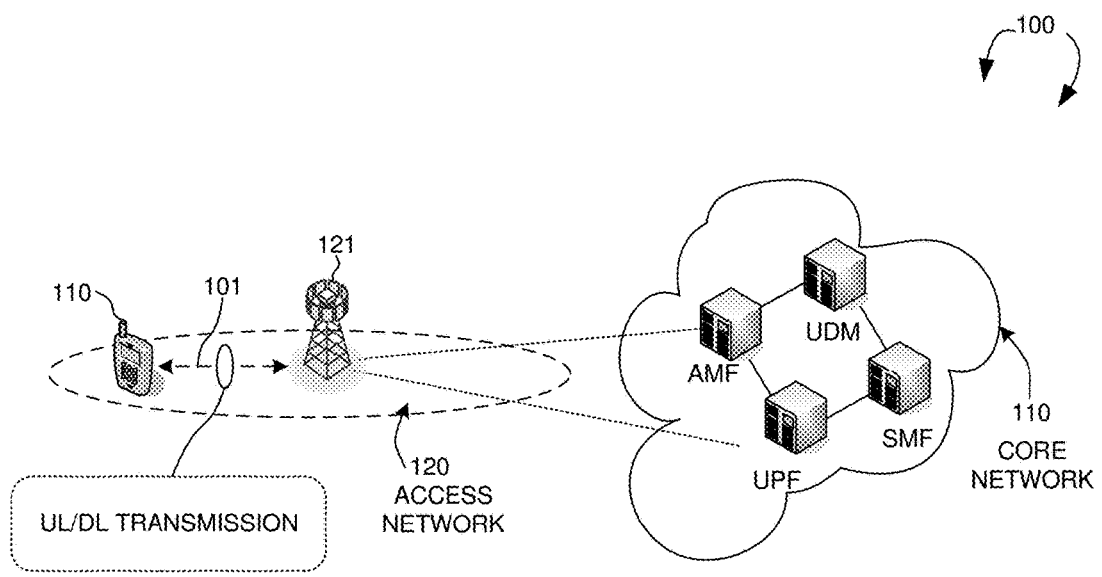
FIG. 1 illustrates an exemplary 5G new radio network supporting power control setting activation for uplink transmission in accordance with embodiments of the current invention.

FIG. 1 illustrates an exemplary 5G new radio (NR) network 100 supporting power control setting activation for uplink (UL) transmission in accordance with aspects of the current invention. The 5G NR network 100 includes a user equipment (UE) 110 communicatively connected to a gNB 121 operating in a licensed band (e.g., 30 GHz~300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 shown in the 5G NR network 100 may include UL transmissions from the UE 110 to the gNB 121 (e.g., on the Physical Uplink Control Channel (PUCCH) or Physical Uplink Shared Channel (PUSCH)) or downlink (DL) transmissions from the gNB 121 to the UE 110 (e.g., on the Physical Downlink Control Channel (PDCCH) or Physical Downlink Shared Channel (PDSCH)).

Figure 2:
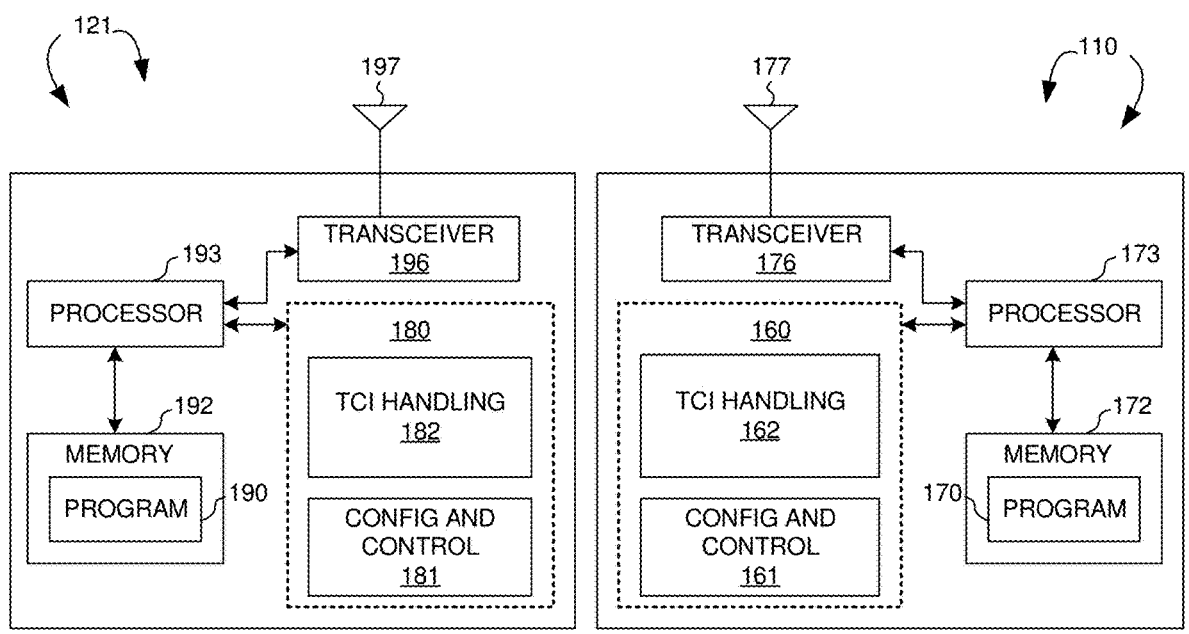
FIG. 2 is a simplified block diagram of the gNB and the UE in accordance with embodiments of the current invention.

FIG. 2 is a simplified block diagram of the gNB 121 and the UE 110 in accordance with embodiments of the present invention. For the gNB 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the gNB 121. Memory 192 stores program instructions and data 190 to control the operations of the gNB 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The gNB 121 and the UE 110 also include several functional modules and circuits that can be implemented and configured to perform embodiments of the present invention. In the example of FIG. 2, the gNB 121 includes a set of control functional modules and circuit 180. Transmission configuration indication (TCI) handling circuit 182 handles TCI state(s) and associated network parameters for the UE 110. Configuration and control circuit 181 provides different parameters to configure and control the UE 110. The UE 110 includes a set of control functional modules and circuit 160. TCI handling circuit 162 handles TCI state(s) and associated network parameters. Configuration and control circuit 161 handles configuration and control parameters from the gNB 121.

Note that the different functional modules and circuits can be implemented and configured by software, firmware, hardware, and any combination thereof. The function modules and circuits, when executed by the processors 193 and 173 (e.g., via executing program codes 190 and 170), allow the gNB 121 and the UE 110 to perform embodiments of the present invention.

Figure 3:
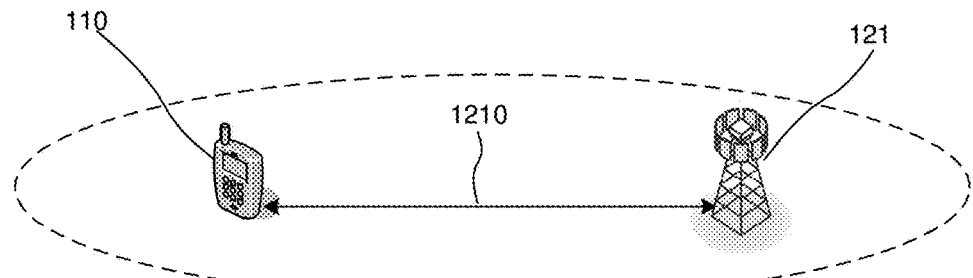
FIG. 3 illustrates one embodiment of message transmissions in accordance with embodiments of the current invention.

FIG. 3 illustrates one embodiment of message transmissions in accordance with one novel aspect. In particular, the gNB 121 transmits an indication 1210 to the UE 110. The indication 1210 indicates a specific TCI state. The UE 110 receives the indication 1210 from the gNB 121. Then, the UE 110 applies the specific TCI state for receptions corresponding to a control resource set (CORESET), which is associated with at least one search space (SS) set when: (1) the at least one SS set is configured with a first type; or (2) any of the at least one SS set is configured with a second type and the CORESET is configured to follow the specific TCI state.

Figure 4A:
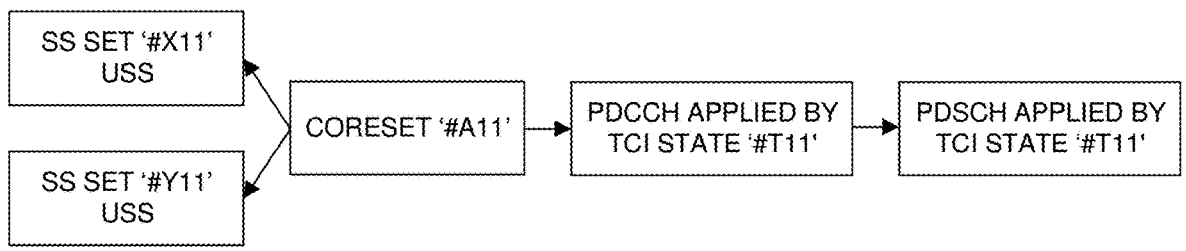
FIG. 4A illustrates an example of associations among at least one SS set, a CORESET and at least one transmission in accordance with embodiments of the current invention.

Please refer to FIG. 4A, which is an example of associations among the at least one SS set, the CORESET and the receptions. In detail, the first type includes UE-specific search space (USS), and the second type includes common search space (CSS). The at least one SS set includes an SS set '#X11' configured with USS and an SS set '#Y11' configured with USS. The CORESET includes a CORESET '#A11' which is associated with the SS sets '#X11' and '#Y11'. The specific TCI state includes a TCI state '#T11'.

Accordingly, because the SS sets '#X11' and '#Y11' are all configured with USS, the UE 110 applies the TCI state '#T11' to the receptions which are: (1) physical downlink control channel (PDCCH) receptions; and (2) physical downlink shared channel (PDSCH) corresponding to the PDCCH receptions.

Figure 4B:
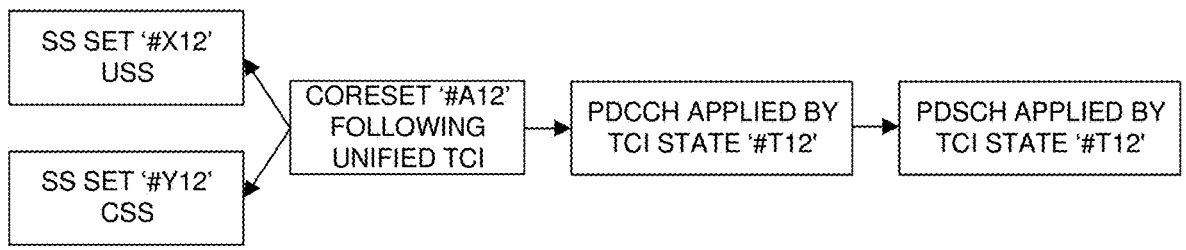
FIG. 4B illustrates an example of associations among at least one SS set, a CORESET and at least one transmission in accordance with embodiments of the current invention.

Please refer to FIG. 4B, which is an example of associations among the at least one SS set, the CORESET and the receptions. In detail, the first type includes USS, and the second type includes CSS. The at least one SS includes an SS set '#X12' configured with USS and an SS set '#Y12' configured with CSS. The CORESET: (1) includes a CORESET '#A12' which is associated with the SS sets '#X12' and '#Y12'; and (2) is configured to follow unified TCI which is the specific TCI state. The specific TCI state includes a TCI state '#T12'.

Accordingly, because: (1) one of the SS sets '#X12' and '#Y12' is configured with CSS; and (2) the CORESET '#A12' is configured to follow the specific TCI state, the UE 110 applies the TCI state '#T12' to: (1) PDCCH receptions; and (2) PDSCH corresponding to the PDCCH receptions.

Figure 5:
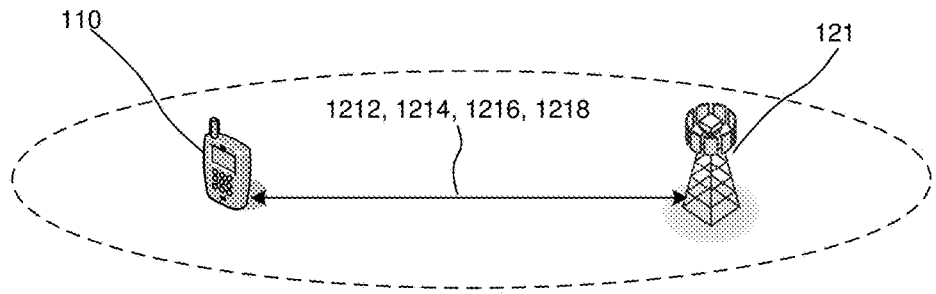
FIG. 5 illustrates one embodiment of message transmissions in accordance with embodiments of the current invention.

FIG. 5 illustrates one embodiment of message transmissions in accordance with one novel aspect. In particular, the gNB 121 transmits a first configuration 1212, a second configuration 1214 and a third configuration 1216 to the UE 110. The UE 110 receives the first configuration 1212, the second configuration 1214 and the third configuration 1216 from the gNB 121.

The first configuration 1212 configures at least one SS set to the UE 110. The second configuration 1214 configures a CORESET to the UE 110. The first configuration 1212 further associates the at least one SS set with the CORESET. The third configuration 1216 records a list of TCI states.

The gNB 121 transmit an indication 1218 to the UE 110. The indication 1218, which may include an activation command (e.g., a media access control-control element (MAC-CE)) or a downlink control information (DCI), indicates a specific TCI state on the list of the TCI states. Then, the UE 110 applies the specific TCI state for receptions corresponding to the CORESET when: (1) the at least one SS set is configured with only a first type; or (2) any of the at least one SS set is configured with a second type and the CORESET is configured to follow the specific TCI state according to a specific parameter in the second configuration 1214.

Figure 6A:
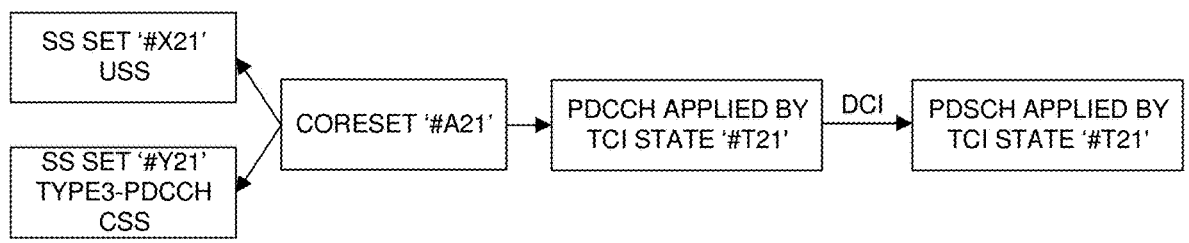
FIG. 6A illustrates an example of associations among at least one SS set, a CORESET and at least one transmission in accordance with embodiments of the current invention.

Please refer to FIG. 6A, which is an example of associations among the at least one SS set, the CORESET and the receptions. In detail, the first type includes USS or Type3-PDCCH CSS (which is specified in 3GPP specification), and the second type includes CSS except Type3-PDCCH CSS. The at least one SS set includes an SS set '#X21' configured with USS and an SS set '#Y21' configured with Type3-PDCCH CSS. The CORESET includes a CORESET '#A21' which is associated with the SS sets '#X21' and '#Y21'. The specific TCI state includes a TCI state '#T21'.

Accordingly, because the SS sets '#X21' and '#Y21' are all configured with USS or Type3-PDCCH CSS, the UE 110 applies the TCI state '#T21' to the receptions which are: (1) PDCCH receptions; and (2) PDSCH corresponding to the PDCCH receptions.

More specifically, the UE 110 quasi co-locates a first demodulation reference signal (DM-RS) port and a second DM-RS port with at least one reference signal of the TCI state #T21'. The first DM-RS port is for the PDCCH receptions. The second DM-RS port is for the PDSCH receptions scheduled by DCI provided by the PDCCH receptions in the CORESET '#A21'.

Figure 6B:
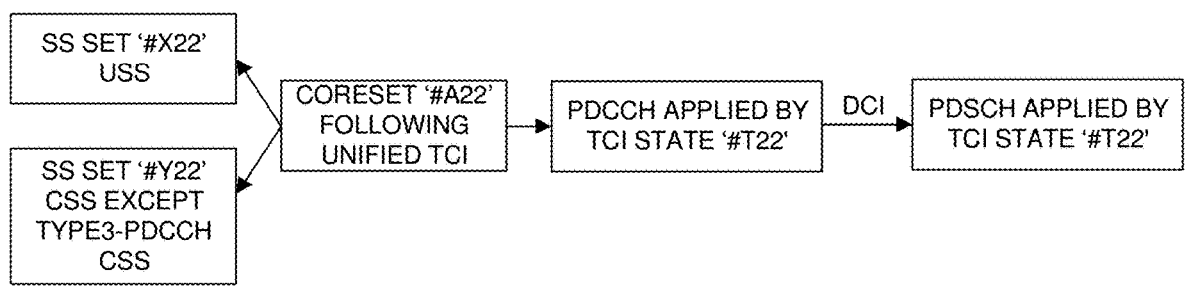
FIG. 6B illustrates an example of associations among at least one SS set, a CORESET and at least one transmission in accordance with embodiments of the current invention.

Please refer to FIG. 6B, which is an example of associations among the at least one SS set, the CORESET and the receptions. In detail, the first type includes USS or Type3-PDCCH CSS (which is specified in 3GPP specification), and the second type includes CSS except Type3-PDCCH CSS. The at least one SS includes an SS set '#X22' configured with USS and an SS set '#Y22' configured with CSS except Type3-PDCCH CSS. The CORESET: (1) includes a CORESET '#A22' which is associated with the SS sets '#X22' and '#Y22'; and (2) is configured to follow unified TCI, which is the specific TCI state, according to the specific parameter in the second configuration 1214. The specific TCI state includes a TCI state '#T22'.

Accordingly, because: (1) one of the SS sets '#X22' and '#Y22' is configured with CSS except Type3-PDCCH CSS; and (2) the CORESET '#A22' is configured to follow the specific TCI state according to the specific parameter in the second configuration 1214, the UE 110 applies the TCI state '#T22' to: (1) PDCCH receptions; and (2) PDSCH corresponding to the PDCCH receptions.

More specifically, the UE 110 quasi co-locates a first DM-RS port and a second DM-RS port with at least one reference signal of the TCI state #T22'. The first DM-RS port is for the PDCCH receptions. The second DM-RS port is for the PDSCH receptions scheduled by DCI provided by the PDCCH receptions in the CORESET '#A22'.

Figure 7:
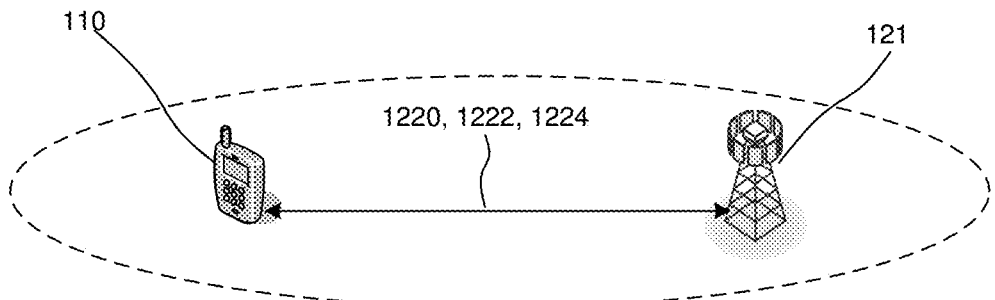
FIG. 7 is a flow chart of a method of applying TCI state in accordance with embodiments of the current invention.

FIG. 7 illustrates one embodiment of message transmissions in accordance with one novel aspect. In particular, the gNB 121 transmits a radio resource control (RRC) configuration 1220 to the UE 110. The RRC configuration 1220 indicates to the UE 110 multiple TCI states. The gNB 121 transmits an activation command 1222 (e.g., a MAC-CE) to the UE 110. The activation command 1222 is used for the UE 110 to activate a subset of the multiple TCI states. The activation command 1222 indicates to the UE 110 an index of a CORESET pool.

In some embodiments, when the activation command 1222 is used for the UE 110 to activate only one of the multiple TCI states, the UE 110 applies the only one activated TCI state as the specific TCI state to DM-RS ports of PDCCH and PDSCH.

In some embodiments, when the activation command 1222 is used for the UE 110 to activate more than one of the multiple TCI states, the gNB 121 transmits an indication 1224 (e.g., a DCI) to the UE 110. The indication 1224 indicates to the UE 110 at least one TCI state of the activated TCI states as the specific TCI state. The UE 110 applies the specific TCI state to DM-RS ports of PDCCH and PDSCH.

In some embodiments, the UE 110 applies the specific TCI state for receptions corresponding to a CORESET that belongs to the CORESET pool. In some embodiments, the UE 110 applies the specific TCI state for receptions corresponding to a CORESET that belongs to the CORESET pool and is associated with at least one SS set when: (1) the at least one SS set is configured with a first type; or (2) any of the at least one SS set is configured with a second type and the CORESET is configured to follow the specific TCI state.

In some embodiments, the receptions corresponding to a CORESET includes (1) PDCCH receptions on the CORESET; and (2) PDSCH receptions corresponding to the PDCCH receptions on the CORESET.

In some implementations, the first type includes USS, and the second type includes CSS. In some implementations, the first type includes USS or Type3-PDCCH CSS, and the second type includes CSS except Type3-PDCCH CSS.

Figure 8:
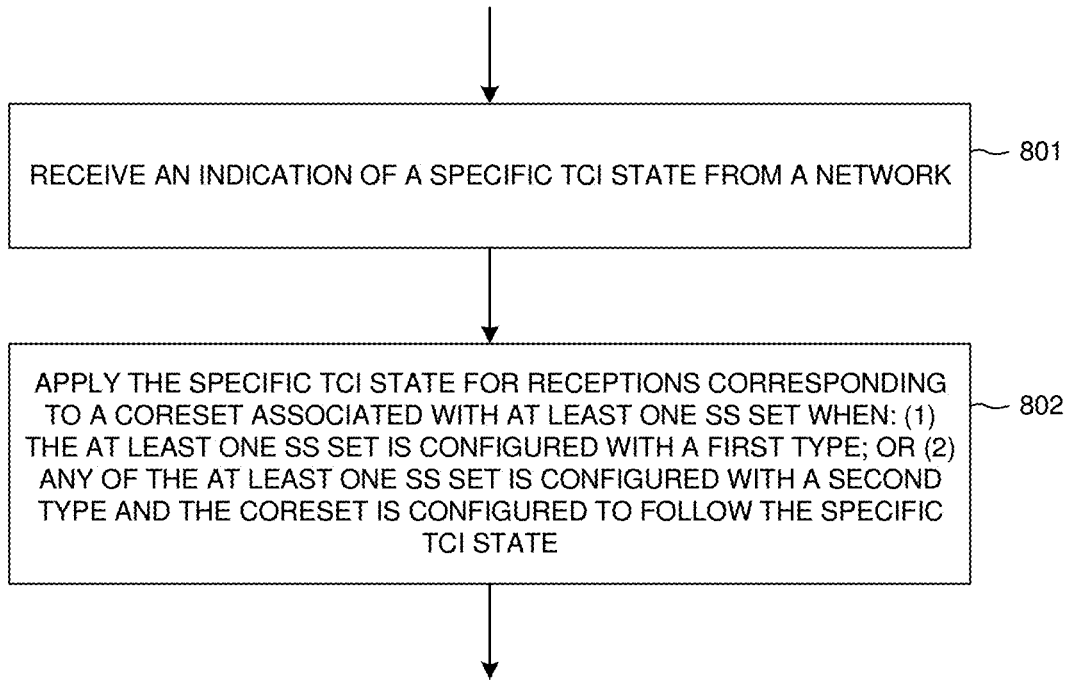
FIG. 8 is a flow chart of a method of applying TCI state in accordance with embodiments of the current invention.

FIG. 8 is a flow chart of a method of applying TCI state in accordance with one novel aspect. In step 801, a UE receives an indication of a specific TCI state from a network. In step 802, the UE applies the specific TCI state for receptions corresponding to a CORESET associated with at least one SS set when: (1) the at least one SS set is configured with a first type; or (2) any of the at least one SS set is configured with a second type and the CORESET is configured to follow the specific TCI state.

In one implementation, the first type includes USS, and the second type includes CSS. In one implementation, the first type includes USS or Type3-PDCCH CSS, and the second type includes CSS except Type3-PDCCH CSS.

Figure 9:
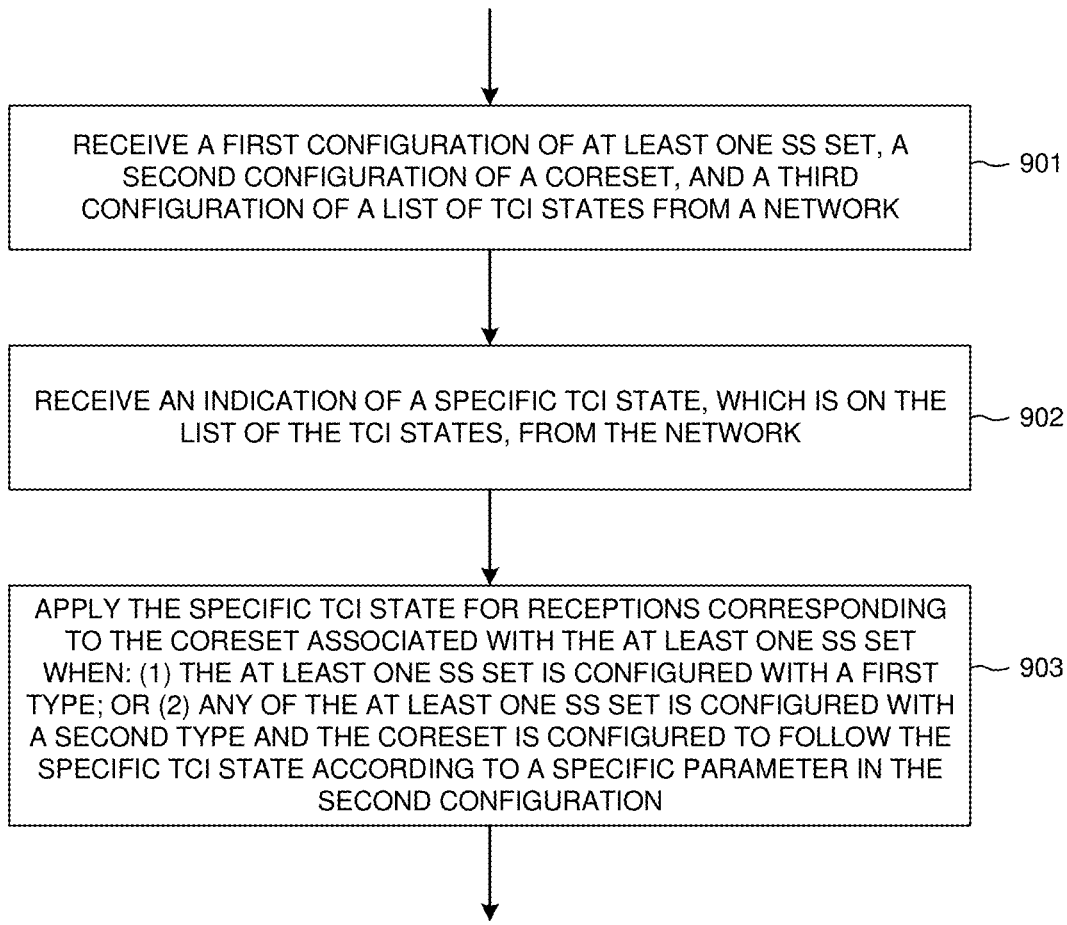
FIG. 9 is a flow chart of a method of applying TCI state in accordance with one novel aspect.

FIG. 9 is a flow chart of a method of applying TCI state in accordance with one novel aspect. In step 901, a UE receives a first configuration of at least one SS set, a second configuration of a CORESET, and a third configuration of a list of TCI states from a network. The CORESET is associated with the at least one SS set according to the first configuration.

In step 902, the UE receives an indication of a specific TCI state, which is on the list of the TCI states, from the network. In step 903, the UE applies the specific TCI state for receptions corresponding to the CORESET associated with the at least one SS set when: (1) the at least one SS set is configured with a first type; or (2) any of the at least one SS set is configured with a second type and the CORESET is configured to follow the specific TCI state according to a specific parameter in the second configuration.

In one implementation, the indication includes an activation command (e.g., a MAC-CE) or a DCI. In one implementation, the first type includes USS, and the second type includes CSS. In one implementation, the first type includes USS or Type3-PDCCH CSS, and the second type includes CSS except Type3-PDCCH CSS.

In one implementation, operation of applying the specific TCI state for the receptions in step 903 includes operation of applying the specific TCI state to PDCCH receptions and PDSCH receptions corresponding to the PDCCH receptions. More specifically, operation of applying the specific TCI state for the receptions in step 903 includes quasi co-locating a first DM-RS port and a second DM-RS port with at least one reference signal of the specific TCI state while the first DM-RS port is for PDCCH receptions and the second DM-RS port is for PDSCH receptions corresponding to the PDCCH receptions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving, by a user equipment (UE), an indication of a specific transmission configuration indication (TCI) state from a network; and
applying, by the UE, the specific TCI state for receptions corresponding to a control resource set (CORESET) associated with at least one search space set when:
the at least one search space set is configured with a first type, or
any of the at least one search space set is configured with a second type and the CORESET is configured to follow the specific TCI state.

2. The method of claim 1, further comprising:
receiving, by the UE, a first configuration of the at least one search space set from the network, wherein the CORESET is associated with the at least one search space set according to the first configuration.

3. The method of claim 2, further comprising:
receiving, by the UE, a second configuration of the CORESET from the network.

4. The method of claim 3, wherein the CORESET is configured to follow the specific TCI state according to a specific parameter in the second configuration.

5. The method of claim 1, further comprising,
receiving, by the UE, a configuration of a list of TCI states,
wherein the specific TCI state is on the list of the TCI states.

6. The method of claim 1, wherein the first type includes UE-specific search space, and the second type includes common search space.

7. The method of claim 1, wherein the first type includes UE-specific search space or Type3-physical downlink control channel common search space (Type3-PDCCH CSS), and the second type includes common search space (CSS) except Type3-PDCCH CSS.

8. The method of claim 1, wherein the step of applying the specific TCI state for the receptions corresponding to the CORESET includes:
applying, by the UE, the specific TCI state to physical downlink control channel (PDCCH) receptions and physical downlink shared channel (PDSCH) receptions corresponding to the PDCCH receptions.

9. The method of claim 1, wherein the step of applying the specific TCI state for the receptions corresponding to the CORESET includes:
quasi co-locating, by the UE, a first demodulation reference signal (DM-RS) port and a second DM-RS port with at least one reference signal of the specific TCI state, wherein the first DM-RS port is for physical downlink control channel (PDCCH) receptions and the second DM-RS port is for physical downlink shared channel (PDSCH) receptions corresponding to the PDCCH receptions.

10. The method of claim 1, wherein the indication includes an activation command or a downlink control information.

11. A user equipment (UE) comprising:
a transceiver that receives an indication of a specific transmission configuration indication (TCI) state from a network; and
a transmission configuration indication (TCI) handling circuit that applies the specific TCI state for receptions corresponding to a control resource set (CORESET) associated with at least one search space set when:
the at least one search space set is configured with a first type, or
any of the at least one search space set is configured with a second type and the CORESET is configured to follow the specific TCI state.

12. The UE of claim 11, wherein the transceiver further receives a first configuration of the at least one search space set from the network, and the CORESET is associated with the at least one search space set according to the first configuration.

13. The UE of claim 12, wherein the transceiver further receives a second configuration of the CORESET from the network.

14. The UE of claim 13, wherein the CORESET is configured to follow the specific TCI state according to a specific parameter in the second configuration.

15. The UE of claim 11, wherein the transceiver further receives a third configuration of a list of TCI states, and the specific TCI state is on the list of the TCI states.

16. The UE of claim 11, wherein the first type includes UE-specific search space, and the second type includes common search space.

17. The UE of claim 11, wherein the first type includes UE-specific search space or Type3-physical downlink control channel common search space (Type3-PDCCH CSS), and the second type includes common search space (CSS) except Type3-PDCCH CSS.

18. The UE of claim 11, wherein the TCI handling circuit further applies the specific TCI state to physical downlink control channel (PDCCH) receptions and physical downlink shared channel (PDSCH) receptions corresponding to the PDCCH receptions.

19. The UE of claim 11, wherein the TCI handling circuit further quasi co-locates a first demodulation reference signal (DM-RS) port and a second DM-RS port with at least one reference signal of the specific TCI state, the first DM-RS port is for physical downlink control channel (PDCCH) receptions, and the second DM-RS port is for physical downlink shared channel (PDSCH) receptions corresponding to the PDCCH receptions.

20. The UE of claim 11, wherein the indication includes an activation command or a downlink control information.

* * * * *